United States Patent
Liu et al.

(10) Patent No.: US 9,202,511 B1
(45) Date of Patent: Dec. 1, 2015

(54) CURRENT-BASED ENVIRONMENT DETERMINATION

(71) Applicant: SEAGATE TECHNOLOGY LLC, Cupertino, CA (US)

(72) Inventors: Xiong Liu, Singapore (SG); Chris M. Woldemar, Santa Cruz, CA (US); Lihong Zhang, Singapore (SG); ShuangQuan Min, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/307,130

(22) Filed: Jun. 17, 2014

(51) Int. Cl.
| | |
|---|---|
| G11B 19/04 | (2006.01) |
| G11B 19/28 | (2006.01) |
| G11B 5/60 | (2006.01) |

(52) U.S. Cl.
CPC ............ G11B 19/046 (2013.01); G11B 5/6011 (2013.01); G11B 19/28 (2013.01)

(58) Field of Classification Search
None
See application file for complete search history.

(56) References Cited

U.S. PATENT DOCUMENTS

| | | | |
|---|---|---|---|
| 3,559,009 A | 1/1971 | Mills | |
| 5,258,695 A | 11/1993 | Utenick et al. | |
| 6,597,134 B2 | 7/2003 | Brenden et al. | |
| 6,771,032 B2 | 8/2004 | Cox-Smith et al. | |
| 6,961,199 B2* | 11/2005 | Onda et al. | 360/69 |
| 7,400,466 B2* | 7/2008 | Lee et al. | 360/73.03 |
| 7,508,618 B1* | 3/2009 | Herbst et al. | 360/75 |
| 7,605,996 B2* | 10/2009 | Baumgart et al. | 360/75 |
| 7,738,211 B2* | 6/2010 | Oyamada et al. | 360/75 |
| 7,768,734 B2* | 8/2010 | Tabuchi et al. | 360/75 |
| 7,808,738 B2* | 10/2010 | Mitsunaga et al. | 360/75 |
| 8,143,839 B2 | 3/2012 | Ide et al. | |
| 8,238,051 B2* | 8/2012 | Baumgart et al. | 360/51 |
| 8,320,070 B2* | 11/2012 | Yoshida | 360/75 |
| 8,804,267 B2* | 8/2014 | Huang et al. | 360/73.03 |
| 2013/0003216 A1* | 1/2013 | Yamane | 360/59 |

FOREIGN PATENT DOCUMENTS

WO      02043064 A3     10/2002

* cited by examiner

*Primary Examiner* — Wayne Young
*Assistant Examiner* — James L Habermehl

(57) ABSTRACT

Provided is an apparatus including a motor configured to rotate a rotating member at a rotational speed based on an applied current; and a controller configured to modify one or more operating parameters in response to determining whether a change in an environment has occurred based on the applied current.

17 Claims, 7 Drawing Sheets

CURRENT-BASED ENVIRONMENT DETERMINATION

BACKGROUND

Performance of motors, including fluid dynamic bearing (FDB) motors, have a number of failure mechanisms. Detection of some of the failure mechanisms may be performed by the collection and monitoring of operating data of the system. Adjustments may be made to the system based on the operating data of the system.

SUMMARY

Provided is an apparatus including a motor configured to rotate a rotating member at a rotational speed based on an applied current; and a controller configured to modify one or more operating parameters in response to determining whether a change in an environment has occurred based on the applied current.

These and other features and aspects may be better understood with reference to the following drawings, description, and appended claims.

DRAWINGS

DESCRIPTION

Figure 1:
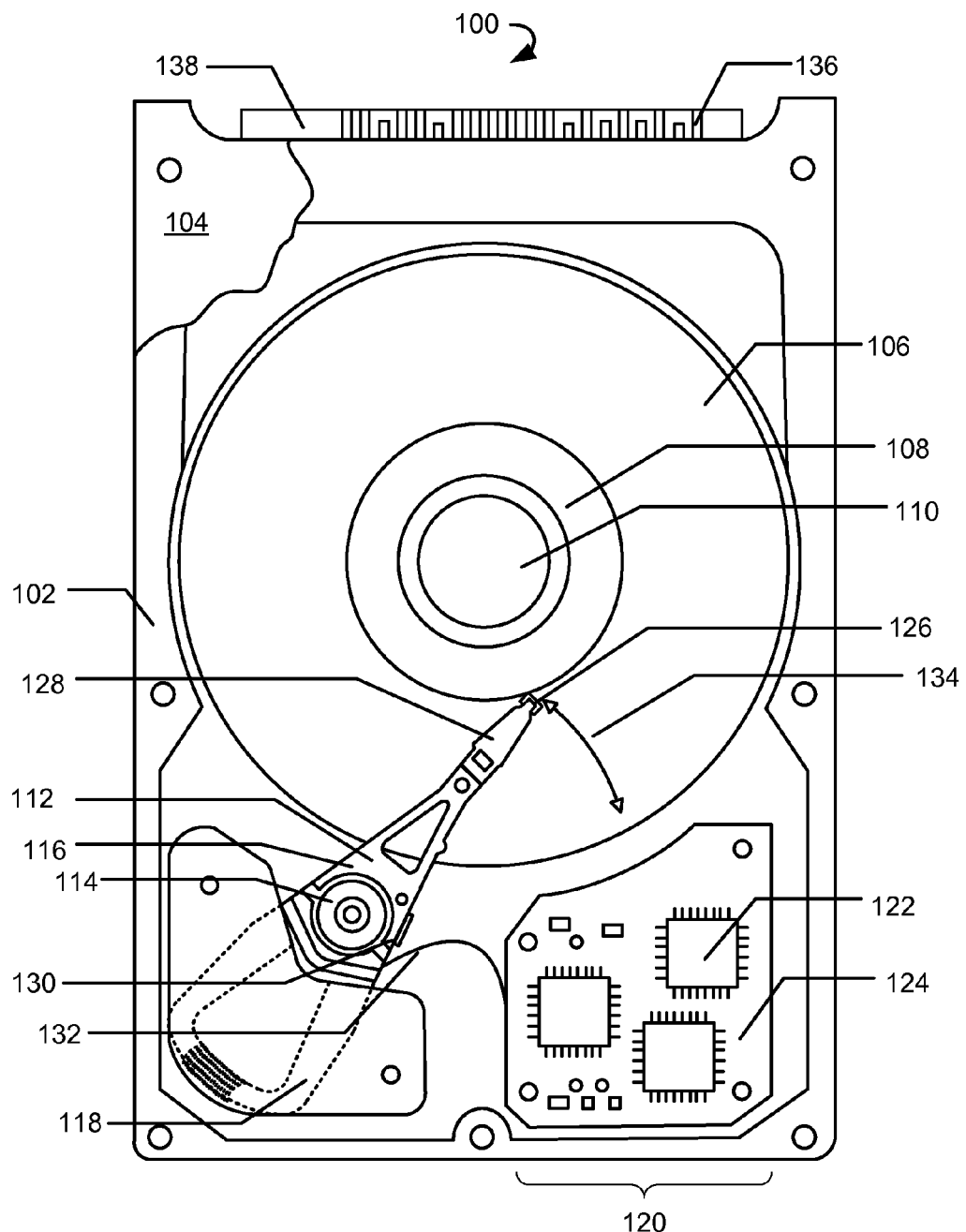
FIG. 1 illustrates an example hard-disk drive (HDD), according to one aspect of the present description.

Before various embodiments are described in greater detail, it should be understood by persons having ordinary skill in the art that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art that the terminology used herein is for the purpose of describing the certain concepts, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the embodiments pertain.

Provided herein are embodiments that provide for detection of possible changes in the environment of a drive (e.g., hard-disk drive (HDD)). Example aspects of the environment of the drive may include the atmospheric temperature, atmospheric pressure, windage, lubricant viscosity, movement of data storage disks (e.g., gyroscopic movement or tilt-drop events), or any combination thereof. In particular embodiments, the environment of the drive may be monitored through the motor run current ($I_{run}$) of the drive and changes in $I_{run}$ may be correlated with problematic developments in regard to drive performance. $I_{run}$ is the current provided to the spindle motor of the drive to rotate one or more disks of magnetic media. For example, changes in atmospheric temperature of the drive may be correlated to changes in lubricant viscosity, which may be measured as a change in $I_{run}$. Furthermore, adjustments may be made to one or more drive operating parameters based the monitored change in $I_{run}$.

Motors (e.g., spindle motors of a HDD) with fluid dynamic bearings (FDB) can wear out due to a number of circumstances including, but not limited to, oil hydrolysis, lubricant evaporation, chemical reaction, surface metal-to-metal contact, and particles in the motor. Without monitoring of these changes, a motor may risk failure without warning.

Changes in motor circumstances or environment may be monitored by changes in the motor current of a spindle motor. Several variables (e.g., servo variables available via SMART, described below) may provide a means to monitor motor current, which changes in relation to bearing drag. Accordingly, the changes in the $I_{run}$ of a motor-based system may indicate an impending failure of the motor and thus the motor based system. Embodiments may thus use data (e.g., Self-Monitoring, Analysis and Reporting Technology (SMART) data) to construct an in-drive measurement of the $I_{run}$ that can be used to monitor the health of a motor (e.g., a FDB spindle motor).

Changes in the environment of a motor may be determined by measuring the amount of $I_{run}$ required to rotate a rotating member of the spindle motor and comparing that $I_{run}$ to a previous measurement, which may come from the manufacturer during certification, or a previous lab measurement. Also, a HDD may be operated for a specified length of time while the $I_{run}$ and energy required to run the spindle motor are monitored. However, such measurements are taken in a precisely controlled environment with equipment external to the motor. For example, a current probe and a thermal chamber may be used. The precisely controlled environment accounts for drive variables including, for example, variations in temperature and power, changes in oil viscosity, the location of the heads, "windage" (air resistance to rotating the rotating member of spindle motor 110), etc.

Motor systems may record data of various operating parameters. An onboard diagnostic system (e.g., Self-Monitoring, Analysis and Reporting Technology (SMART) system) may monitor the health of HDD 100 by storing snapshots of key parameters in an attempt to detect a change in environment.

FIG. 1 illustrates an example HDD, according to one aspect of the present description. A HDD 100 may include a base plate 102 and a cover 104 that may be disposed on the base plate 102 to define an enclosed housing for various HDD components. HDD 100 includes one or more data storage disks 106 of computer-readable data storage media. The major surfaces of each data storage disk 106 include a plurality of concentrically disposed tracks for data storage purposes. Each data storage disk 106 is mounted on a hub 108, which in turn is rotatably interconnected with base plate 102 or cover 104. Multiple data storage disks 106 are typically mounted in vertically spaced and parallel relation on hub 108.

HDD 100 also includes an actuator arm assembly 112 that pivots about a pivot bearing 114, which in turn is rotatably supported by the base plate 102 or cover 104. Actuator arm assembly 112 includes one or more individual rigid actuator arms 116 that extend out from near the pivot bearing 114. Multiple actuator arms 116 are disposed in vertically spaced relation, with one actuator arm 116 being provided for each major data storage surface of each data storage disk 106 of HDD 100. Other types of actuator arm assembly configurations could be utilized as well, an example being an "E" block having one or more rigid actuator arm tips, or the like, that cantilever from a common structure. Movement of actuator arm assembly 112 is provided by an actuator arm drive assembly, such as a voice-coil motor (VCM) 118 or the like. VCM 118 is a magnetic assembly that controls the operation of actuator arm assembly 112 under the direction of control electronics 120.

Control electronics 120 may include a plurality of integrated circuits (ICs) 122 coupled to a printed circuit board (PCB) 124. Control electronics 120 may be coupled to VCM 118, a slider 126, or spindle motor 110 using interconnects that can include pins, cables, or wires (not shown). ICs 122 may include a processor, controller, or other component configured for performing one or more processes, such as for example the process illustrated by the example of FIG. 6. ICs 122 may further include an electronic component, for example a controller, configured to receive data from one or more sensors (not shown). Control electronics 120 may determine the $I_{run}$ transmitted to spindle motor 110 through a motor speed proportional and integral (PI) control loop. An adaptive gain of the PI control loop may be highly correlated with the $I_{run}$ and in particular embodiments may be used to monitor the value of $I_{run}$. The $I_{run}$ or adaptive gain values may be stored in the SMART system. In particular embodiments, the history of the $I_{run}$ is available as part of the SMART system data and used to determine the change in environment of HDD 100.

A load beam or suspension 128 is attached to the free end of each actuator arm 116 and cantilevers therefrom. Suspension 128 may biased toward its corresponding data storage disk 106 by a spring-like force. Slider 126 is disposed at or near the free end of each suspension 128. What is commonly referred to as the read/write head (e.g., transducer) is appropriately mounted as a head unit (not shown) underneath slider 126 and is used in disk drive read/write operations. The head unit may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit is connected to a preamplifier 130, which is interconnected with control electronics 120 of HDD 100 by a flex or printed circuit cable (PCC) 132 that is mounted on actuator arm assembly 112. Signals are exchanged between the head unit and its corresponding data storage disk 106 for disk drive read/write operations. In this regard, VCM 118 is utilized to pivot actuator arm assembly 112 to simultaneously move slider 126 along a path 134 and across the corresponding data storage disk 106 to position the head unit at the appropriate position on data storage disk 106 for disk drive read/write operations.

When HDD 100 is not in operation, actuator arm assembly 112 is pivoted to a "parked position" to dispose each slider 126 generally at or beyond a perimeter of its corresponding data storage disk 106, but in any case in vertically spaced relation to its corresponding data storage disk 106. In this regard, HDD 100 includes a ramp assembly (not shown) that is disposed beyond a perimeter of the data storage disk 106 to move corresponding slider 126 vertically away from its corresponding data storage disk 106 and to also exert somewhat of a retaining force on actuator arm assembly 112.

Exposed contacts 136 of a drive connector 138 along a side end of HDD 100 may be used to provide connectivity between circuitry of HDD 100 and a next level of integration such as an interposer, a circuit board, a cable connector, or an electronic assembly. Drive connector 138 may include jumpers (not shown) or switches (not shown) that may be used to configure HDD 100 for user specific features or configurations. The jumpers or switches may be recessed and exposed from within drive connector 138.

A spindle motor 110 rotates data storage disks 106 using a bearing system coupled to a shaft disposed in the center of hub 108. The bearings permit rotational movement between the shaft and hub 108, while maintaining alignment of a spindle holding data storage disks 106 to hub 108. In particular embodiments, spindle motor 110 may have a fluid dynamic bearing with a lubricating fluid such as gas or liquid or air that provides a bearing surface between a fixed member and a rotating member of spindle motor 110. Spindle motor 110 may be an electric motor that receives an electrical signal ($I_{run}$) that controls the movement of the rotating member of spindle motor 110. As described below, the amount of current ($I_{run}$) provided to spindle motor may be used to monitor the operating conditions of HDD 100. For example, in normal operation, the rotating member of spindle motor 110 rotates at a pre-determined rotational speed for a pre-determined value of $I_{run}$. Variation in the viscosity of the lubricating fluid of the fluid dynamic bearing may cause the value of $I_{run}$ needed to maintain the pre-determined rotational speed of the rotating member of spindle motor 110 to vary. The sensors and controller of control electronics 120 may be used as part of an onboard diagnostic system (e.g., SMART), may monitor operating data (e.g., $I_{run}$) of HDD 100 by storing snapshots of key variables. The values of $I_{run}$ may be stored in the SMART system and the history of the $I_{run}$ available as part of the SMART system data. Although this disclosure describes a controller receiving HDD operating data as being integrated with particular control electronics, this disclosure contemplates a controller receiving HDD operating data that is integrated with any suitable circuitry or implemented as a standalone circuit.

In particular embodiments, monitoring of a long-term motor mechanical property change based on electrical output from the PI control loop is based on spindle motor 110 being linear time-invariant (LTI) (e.g., computed or modeled as LTI). In other words, it may be assumed that the environment of HDD 100 is not function of time and is a function of other factors (e.g., windage or lubricant viscosity). For monitoring environmental changes based on measurement of the $I_{run}$, spindle motor 110 characteristics are treated as time invariant and spindle motor 110 will respond linearly with respect to the change of operating/environmental factors. The operating and environmental factors may include $I_{run}$ (e.g., through servo variables that relate to the commanded Irun provided by control electronics 120), power-on time, actuator arm 116 position, drive depop configuration, atmospheric temperature, and supply voltage.

In particular embodiments, the SMART data includes a "scaled motor current" that is captured by the SMART system at a fixed time intervals. $I_{run}$ may be measured when the read/write heads of HDD 100 are at the inner diameter (ID) of data storage disk 106 and HDD 100 is in embedded mode. For example, if the read/write head moves away from the ID of data storage disk 106, for a 3.5" HDD, the effect of the read/write head position on the drag is small. Experimental data has shown that the actuator arm position effect on an $I_{run}$ measurement is small enough to be not considered (e.g., may be ignored). Thus, with $I_{run}$ being measured when the read/write heads are at the ID of data storage disk 106 each time, the data corresponding to $I_{run}$ may be compared without further processing, and the position of actuator arm 116 may be removed as a variable.

Figure 2:
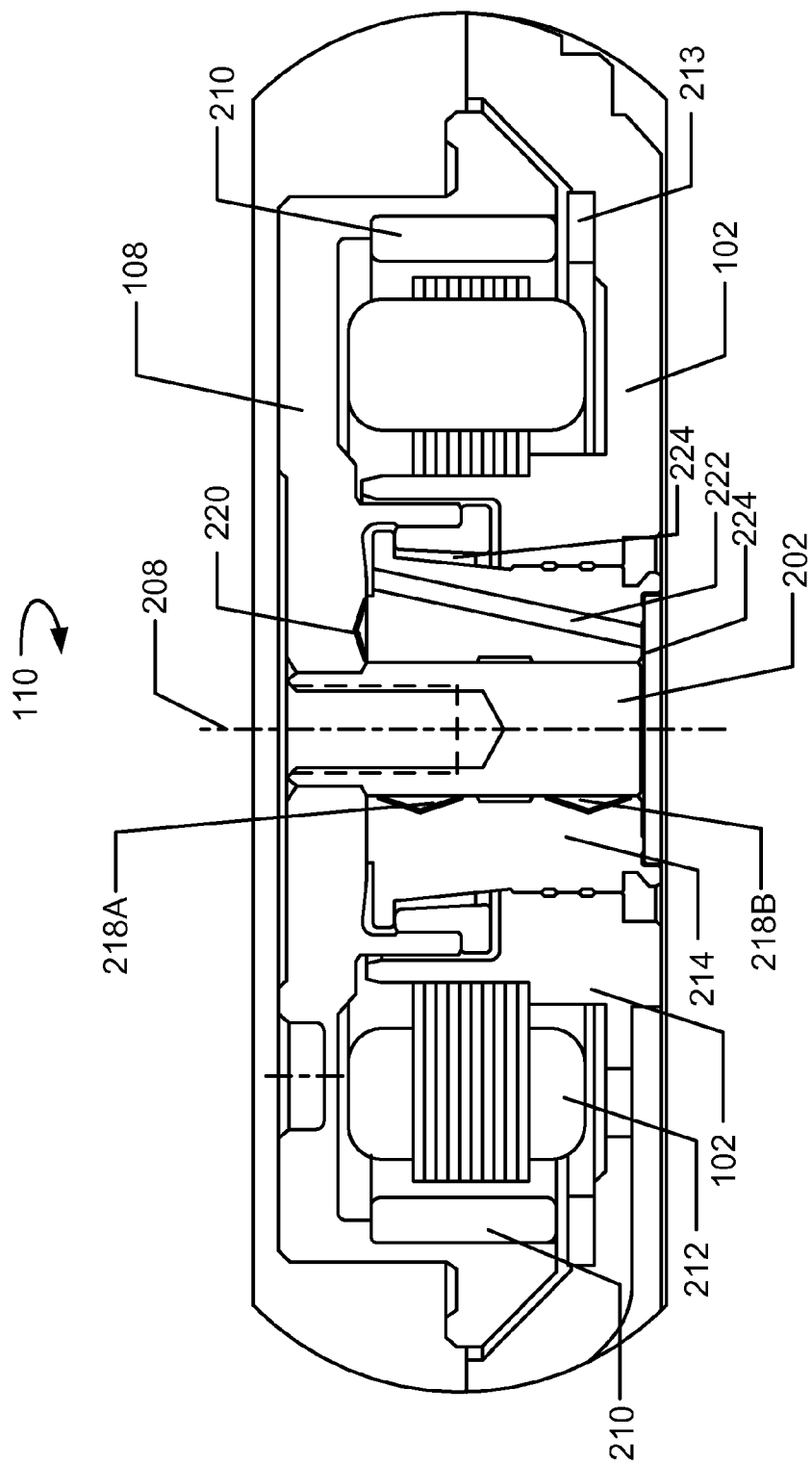
FIG. 2 illustrates an example cross-sectional side view of a spindle motor for a drive, according to one aspect of the present description.

FIG. 2 illustrates an example cross-sectional side view of a spindle motor for a drive, according to one aspect of the present description. Although this disclosure illustrated and describes a spindle motor having a particular configuration of stationary and rotating components (e.g., a rotating shaft and stationary sleeve), this disclosure contemplates a spindle motor with any suitable configuration of stationary and rotating components, such as a rotating sleeve and a stationary shaft. As described above, spindle motor 110 includes a stationary component and a rotatable component positioned for relative rotation (e.g., revolutions per minute (RPM) of about 4,800; 5,400; 7,200; 10,000; 15,000, etc.) with respect to each other. The stationary component includes, but is not limited to, components coupled to a base plate 102, such as a stator 212 and a sleeve 214. Components and/or sub-components of the stationary component may also be referred to as stationary components herein, such as a stationary stator 212 and a stationary sleeve 214.

The rotatable component includes, but is not limited to, components such as a shaft 202, a hub 108, and a magnet 210 coupled to hub 108. Components and/or sub-components of the rotatable component may also be referred to as rotatable components herein, such as a rotatable shaft 202, a rotatable hub 108, and a rotatable magnet 210. Hub 108 includes a hub flange, which supports one or more data storage disks 106 for rotation about a central axis 208 of shaft 202. In operation, magnet 210 coupled to hub 108 interacts with the stator 212 to cause hub 108 and data storage disks 106 to rotate.

One or more fluid dynamic bearings (e.g., journal bearing; thrust bearing; etc.) may be defined between the stationary component and the rotatable component. Spindle motor 110 may include, for example, a journal bearing 218A comprising a groove pattern (e.g., chevron-shaped groove pattern) on one of sleeve 214 or rotating shaft 202 as represented by the chevron-shaped groove on sleeve 214. Journal bearing 218A, an upper journal bearing, along with lower journal bearing 218B, provides radial stiffness to shaft 202 of spindle motor 110, restricts radial movement of shaft 202 in a direction perpendicular to the central axis 208, and substantially prevents tilting of shaft 202.

Spindle motor 110 also includes, for example, a thrust bearing 220 comprising a groove pattern (e.g., chevron-shaped groove pattern) on one of sleeve 214 or hub 108 as represented by the chevron-shaped groove on hub 108. Thrust bearing 220 provides an upward force on hub 108 to counterbalance downward forces such as the weight of hub 108, axial forces between hub 108 and a biasing magnet 213, and axial forces between stator 212 and magnet 210.

Spindle motor 110 may further include a fluid, fluid medium, or lubricating fluid 224 such as a liquid (e.g., lubricating oil), a gas, or a combination thereof between the stationary component and the rotatable component. As shown in the example of FIG. 2, a recirculation path 222 extending from an inner radius at a bottom portion of the sleeve 214 to an outer radius at a top portion of the sleeve 214 fluidly connects the one or more fluid dynamic bearings with the lubricating fluid 224 and further supplies the lubricating fluid 224 to these one or more fluid dynamic bearings. In particular embodiments, recirculation path 222 may include a capillary seal formed from diverging surfaces and an interface between the lubricating fluid and air. Centrifugal force generated by rotation of rotating shaft 202 forces lubricating fluid into the fluid dynamic bearing and expelling air.

As described above, spindle motor 110 receives an electrical signal ($I_{run}$) from control electronics 120 that controls the radial movement of the rotatable components, such as rotatable shaft 202 and rotatable hub 108, of spindle motor 110. The $I_{run}$ is applied to the windings of stator 212 that generates a magnetic field that interacts with the magnetic field of magnet 210. The interaction of the magnetic field generated by the application of $I_{run}$ and the magnetic field of magnet 210 causes the radial movement of rotatable components and data storage disks 106 about central axis 208. As described below, the value of $I_{run}$ provided to stator 212 may be proportional to the viscosity of the lubricating fluid of the fluid dynamic bearing and may be used to monitor the environment of HDD 100.

Figure 3:
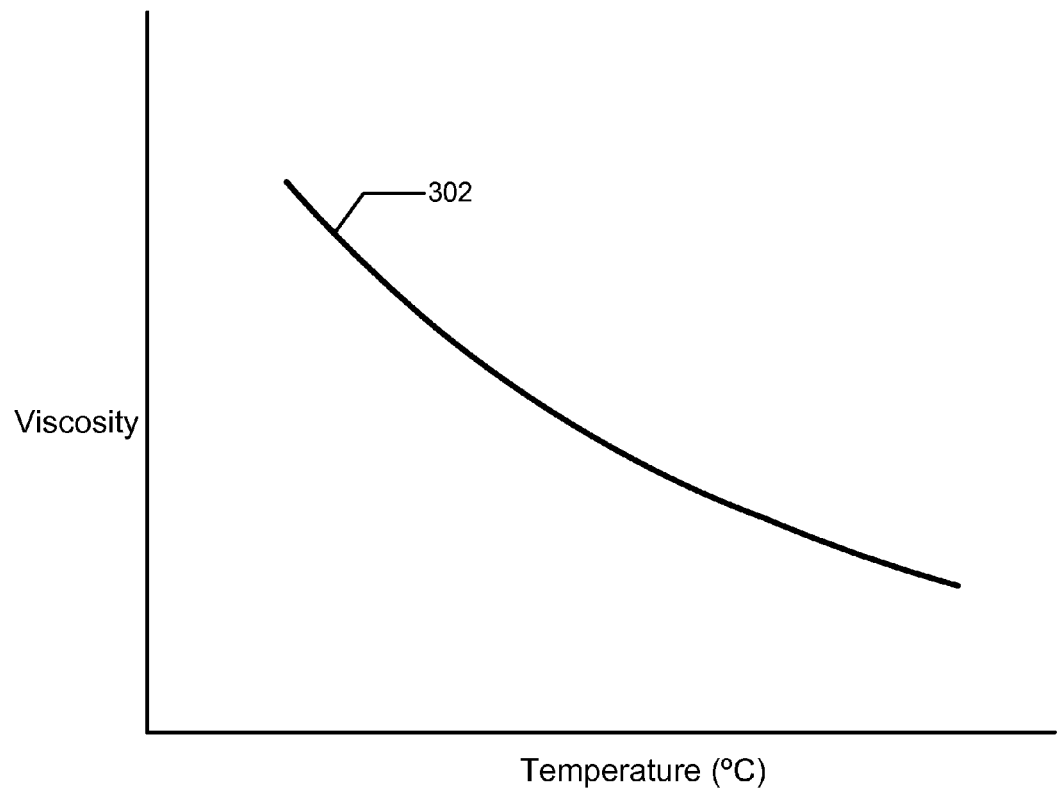
FIG. 3 illustrates an example relationship between atmospheric temperature and lubricant viscosity, according to one aspect of the present description.

FIG. 3 illustrates an example relationship between atmospheric temperature and lubricant viscosity, according to one aspect of the present description. As described below, the environment of HDD 100 may be monitored through the motor current of spindle motor 110. As an example, the environment of HDD 100 may include the atmospheric temperature, atmospheric pressure, windage, lubricant viscosity, movement of data storage disks 106 (e.g., gyroscopic movement or tilt-drop events), or any combination thereof. One method of monitoring the environment (e.g., atmospheric temperature) of HDD 100 may be through a thermistor is located at the bracket area supporting PCC 132. In particular embodiments, the thermistor may be included as part of the SMART diagnostic system. The bracket area supporting PCC 132 may located at the bottom edge of HDD 100 where the air speed is relatively slow, such that the temperature measured by the thermistor may be different from that of the area where the temperature is of main concern. In addition, the thermistor may be located a significant distance from spindle motor 110, which is the main source of heat generation, such that the temperature measured by the thermistor is not sensitive to temperature variations due to the operation of spindle motor 110. As illustrated in the example of FIG. 3, an increase of the atmospheric temperature of HDD 100 would cause a decrease of the lubricant viscosity as shown by 302.

As described below, changes in atmospheric temperature may be monitored through changes in the $I_{run}$ of spindle motor 110. In particular embodiments, the $I_{run}$ for HDD 100 with a particular configuration (e.g., form factor, number of data storage disks 106, rotational speed of rotating member of spindle motor 110, etc.) may be approximated as a linear function of temperature and drag:

$$I_{run} = temp \times \text{coeffs}_0 + drag \times \text{coeffs}_1 + \text{const} \qquad (1)$$

where $\text{coeffs}_0$ is the slope of the temperature with respect to the $I_{run}$, $\text{coeffs}_1$ is the slope of the drag with respect to the $I_{run}$, const is a constant offset, temp is the atmospheric temperature of HDD 100, and drag is the drag of spindle motor 110.

The atmospheric pressure at the elevation that HDD 100 is being operated may affect the drag through its effect on windage. However, the effect of atmospheric pressure on windage may be relatively small and to first order insignificant. For example, the change in elevation from sea level to 20,000 feet above sea level may result in approximately a 10% change in $I_{run}$. A more common case is the use of HDD 100 on an airplane, where the cabin is maintained at an atmospheric pressure equivalent to 6 k feet elevation above sea level. This elevation change would result in approximately 3% change in $I_{run}$. Therefore, to first order the windage and therefore the drag of HDD 100 may be considered a constant and the variation in the $I_{run}$ may be considered to be dominated by variation in atmospheric temperature, such that variations in the atmospheric temperature inside HDD 100 may be determined by monitoring and determining a change in the $I_{run}$.

Figure 4:
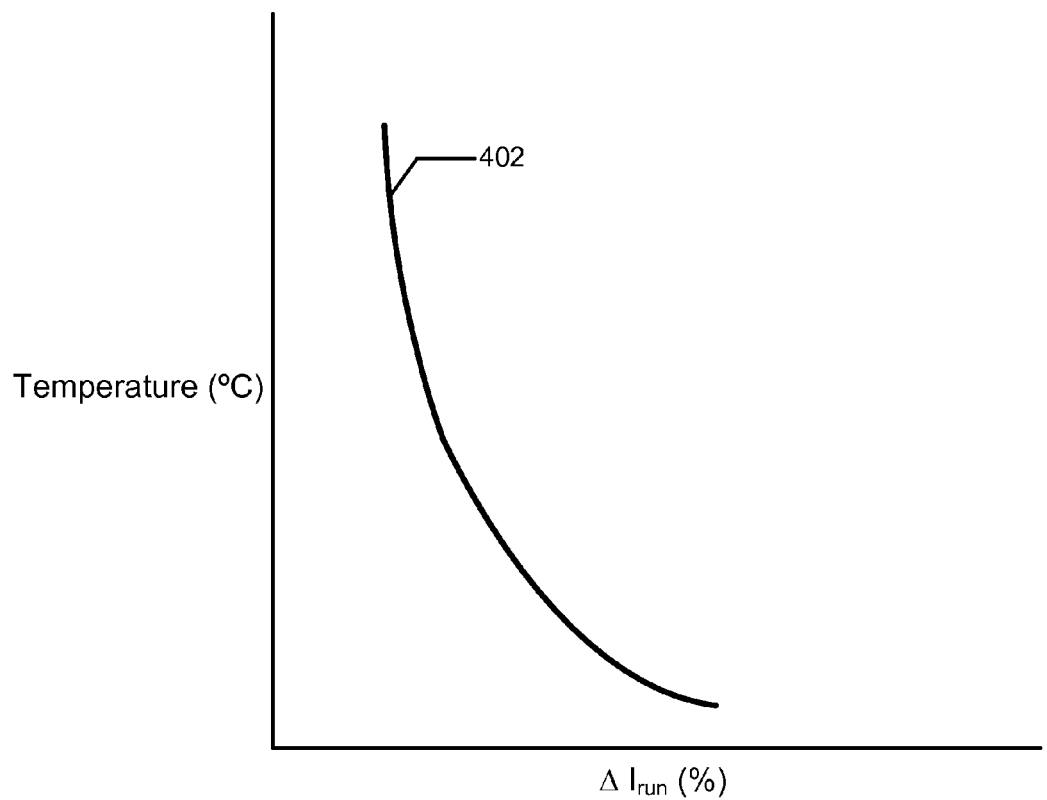
FIG. 4 illustrates an example relationship between atmospheric temperature and $I_{run}$ variation, according to one aspect of the present description.

FIG. 4 illustrates an example relationship between atmospheric temperature and $I_{run}$ variation, according to one aspect of the present description. As illustrated in the example of FIG. 4, the variation in the value of the current ($\Delta I_{run}$) transmitted to spindle motor 110 has an inverse relationship to the atmospheric temperature in HDD 100, as shown by 402. A decrease of the atmospheric temperature of HDD 100 may lead to a decrease of the $I_{run}$. At 0° C., the variation of $I_{run}$ is 124% higher than at 65° C. In particular embodiments, the relationship between atmospheric temperature and $I_{run}$ variation may be determined experimentally for HDDs 100 with a particular configuration (e.g., form factor, number of data storage disks 106, rotational speed of rotating member of spindle motor 110, etc.). For example, the value of $I_{run}$ provided to spindle motor 110 is directly correlated to pre-determined rotational speed used for normal operation of HDD 100. In other words, a higher rotational speed requires a higher value of $I_{run}$. As another example, the amount of torque required to rotate the rotating member of spindle motor 110 at the pre-determined rotational speed is proportional to the mass attached to the rotating member. The mass attached to the rotating member is in turn proportional to the number of data storage disks 106. Therefore, the higher the number of data storage disks 106, the higher value of $I_{run}$ that is required to rotate the rotating member at the pre-determined rotational speed. In addition, size and number of data storage disks 106 is based on the form factor of HDD 100, which as discussed above affects the value of $I_{run}$.

For example, a temperature may be selected from a temperature range (e.g., from a predetermined temperature range) and the $I_{run}$ value measured. In one example, the temperature may be varied from 0° C. to 60° C. (e.g., in 4° C. or any suitable temperature increments) or over any suitable temperature range for the particular HDD 100. In particular embodiments, the relationship between atmospheric temperature and $I_{run}$ variation may be determined experimentally for each HDD 100. As an example, the relationship between atmospheric temperature and $I_{run}$ variation may be modeled using a $2^{nd}$ order polynomial. In other particular embodiments, the $I_{run}$ for a particular HDD 100 may be measured at two or more points (e.g., the endpoints) in the temperature range of interest and the $I_{run}$ at intermediate temperatures interpolated based on a previously determined atmospheric temperature and $I_{run}$ relationship from HDDs 100 with similar characteristics.

As described above, the relationship between atmospheric temperature and $I_{run}$ variation may be determined for individual HDDs 100 or an average relationship may be determined based on a statistically significant number of HDDs 100 with similar characteristics (e.g., form factor, number of data storage disks 106, rotational speed of rotating member of spindle motor 110, etc.) and applied to HDDs 100 having the same characteristics. For example, the relationship between atmospheric temperature and $I_{run}$ variation may be determined for individual HDDs 100 may be measured during a certification test for HDD 100. Furthermore, the value of $I_{run}$ at room temperature (e.g., approximately 25° C.) may be stored for subsequent access by ICs 122.

Changes in the atmospheric temperature may be determined through this relationship by detecting variation in the $I_{run}$ provided to spindle motor 110. For example, a detected variation in $I_{run}$ may be correlated to a variation in atmospheric temperature based on the example relationship between atmospheric temperature and $I_{run}$ variation illustrated by 302. In particular embodiments, a controller of HDD 100 may calculate the difference between a current value of $I_{ron}$ and the stored value of $I_{run}$ measured at room temperature. The change in atmospheric temperature of HDD 100 may be determined using the calculated difference in $I_{run}$ and the relationship between atmospheric temperature and $I_{run}$. As described below, one or more operating variables may be modified by a controller of HDD 100 based on detecting a change in the atmospheric temperature of HDD 100. In particular embodiments, the value of $I_{run}$ measured at room temperature compared to the value of $I_{run}$ for HDDs 100 with similar characteristics may be used to screen HDDs 100 for potential reliability failures during certification.

Figure 5:
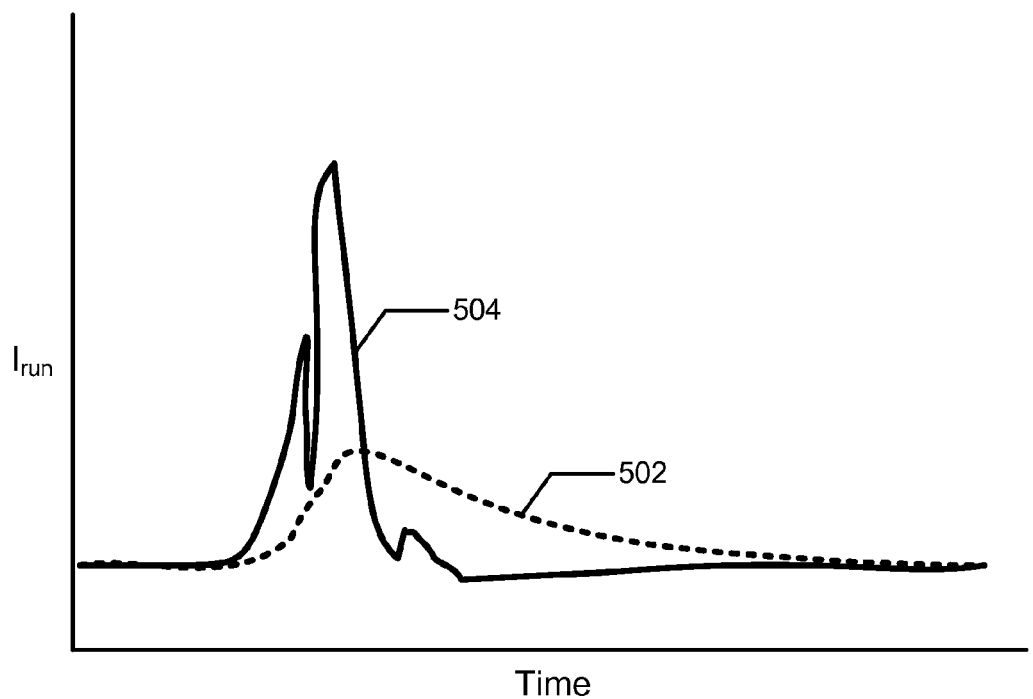
FIG. 5 illustrates an example behavior of $I_{run}$ as a function of time, according to one aspect of the present description.

FIG. 5 illustrates an example tilt-drop behavior of $I_{run}$ as a function of time, according to one aspect of the present description. Monitoring the $I_{run}$ may be used to determine other environmental aspects of HDD 100. As an example, occurrence of a tilt-drop event or sudden off-axis movement of HDD 100 may be determined by monitoring $I_{run}$. For example, a tilt-drop event may be determined by detecting a spike in the value of $I_{run}$. As illustrated in the example of FIG. 5, the spindle motor 110 current ($I_{run}$) may have an example behavior in normal operation, as shown by 502. In contrast, the $I_{run}$ behavior may exhibit a sharp peak, illustrated by 504, during a tilt-drop event. In particular embodiments, a controller of HDD 100 may calculate a difference between a current value of $I_{run}$ and an average value of $I_{run}$. Furthermore, the average value of $I_{run}$ may be calculated based on the current and stored values of $I_{run}$. In particular embodiments, one or more operating variables of HDD 100 may be modified based on determining a difference between a current value of $I_{run}$ and an average value of $I_{run}$ is higher than a pre-determined threshold value.

Figure 6:
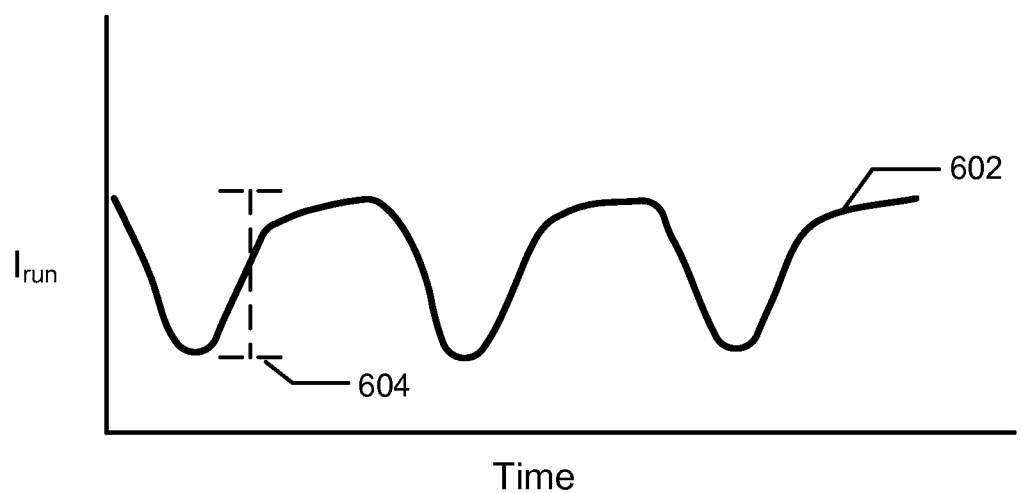
FIG. 6 illustrates an example gyration behavior of $I_{run}$ as a function of time, according to one aspect of the present description.

FIG. 6 illustrates an example gyration behavior of $I_{run}$ as a function of time, according to one aspect of the present description. In particular embodiments, gyration or fluctuation of the outer diameter (OD) of data storage disks 106 relative to a ramp may be determined based on monitoring $I_{run}$. Gyration of data storage disks 106 may cause the rotational speed of the rotating member of spindle motor 110 to deviate, in turn causing the value of $I_{run}$ 602 to vary in order to compensate for the deviation in the rotational speed. As an example, the amount of gyration is proportional to the difference between the maximum or "peak" and minimum or "valley" values of $I_{run}$, illustrated by 604. In particular embodiments, controller may calculate a difference 604 between a maximum value of $I_{run}$ and a minimum value of $I_{run}$. In particular embodiments, one or more operating variables may be modified based on a difference 604 between a maximum and minimum values of $I_{run}$ being higher than a pre-determined threshold value. As an example, the pre-determined threshold value may be based on a pre-determined percentage of the average value of $I_{run}$, where the average value of $I_{run}$ may be calculated based on the current and stored values of $I_{run}$. As another example, the pre-determined threshold may be based on experimental values of a difference 604 between a maximum value of $I_{run}$ and a minimum value of $I_{run}$ for a number of HDDs 100 with similar characteristics.

One or more operating parameters of HDD 100 may be modified based on detecting a change in the value of the current $I_{run}$ to spindle motor 110. In particular embodiments, control electronics 120 of HDD 100 may include on-board motor condition monitoring. For example, steady-state response function coefficients may be pre-programmed into firmware for use in processing $I_{run}$ data (e.g., adaptive gain) to infer the environment history of HDD 100. In particular embodiments, SMART data (e.g., $I_{run}$) may be used to flag or notify a user of abnormal conditions when a pre-determined level (e.g., threshold) is reached.

In particular embodiments, adjustments may be made to operation of the read/write head of HDD 100. For example, the temperature of the read/write head may be modified based on the inferred change in atmospheric temperature relative to the atmospheric temperature of HDD 100 during calibration. The temperature modification of the read/write head changes the shape and in turn the aerodynamics of the read/write head. For example, a current may be applied to a resistive element positioned in proximity to the read/write head of HDD 100. As another example, actuator arm 116 may be moved toward inner diameter (ID) of data storage disks 106 in response to detecting a gyration or tilt-drop event to prevent actuator arm 116 from being positioned underneath a ramp that actuator arm 116 is "parked" when HDD 100 is powered off. For example, a current to VCM 118 may be increased to reposition actuator arm 116 toward the ID of data storage disks 106. As another example, negative current may be applied to VCM 118 to prevent actuator arm 116 from being stuck underneath the ramp. In particular embodiments, particular operations of HDD 100 may be halted or discontinued based on detecting a gyration event. For example, control electronics 120 of HDD 100 may discontinue a write operation in response to detecting a gyration event. As another example, actuator arm 116 may be kept "parked" on the ramp in response to detecting a gyration event.

Figure 7:
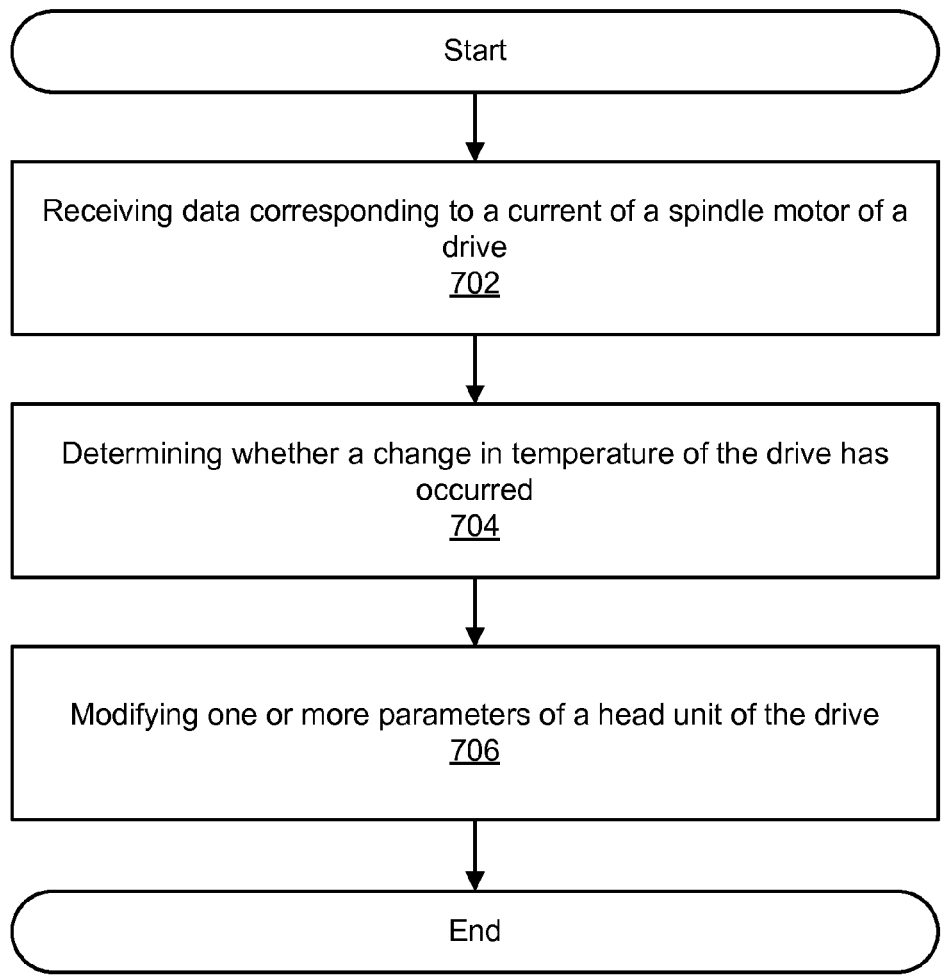
FIG. 7 illustrates an exemplary flow diagram for modifying parameters of a head unit, according to one aspect of the present description.

FIG. 7 illustrates an example flow diagram for modifying parameters of a head unit, according to one aspect of the present description. At block 702, a controller of a drive (e.g., HDD 100) receives data corresponding to a current of a spindle motor 110 of the drive. As described above, a rotating member of spindle motor 110 rotates at a rotational speed that is based on the $I_{run}$ transmitted to spindle motor 110. In particular embodiments, data related to the value of $I_{run}$ may be accessed from the SMART diagnostic system of HDD 100. As described above, the SMART diagnostic system may monitor the health of HDD 100 by storing snapshots of key parameters in an attempt to detect a change in environment. As an example, a controller of HDD 100 may access data of adaptive gain that is correlated with the $I_{run}$ of spindle motor 110. The value of $I_{run}$ provided to spindle motor 110 may be controlled by control electronics 120 of HDD 100 to rotate a rotating member of spindle motor 110 at a pre-determined rotational speed.

At block 704, the controller determines whether a change in a temperature of the drive has occurred based on a pre-determined relationship between the temperature and the data. For example, the pre-determined relationship between the temperature and the data may be determined based on a number of HDDs 100 with similar characteristics (e.g., number of data storage disks 106, form factor, or rotational speed of spindle motor 110). As another example, the pre-determined characteristic may be determined by measuring the value of $I_{run}$ at a number of different temperatures within a temperature range of interest. In particular embodiments, the change of temperature may be determined by comparing a current value of $I_{run}$ to a stored value of $I_{run}$ at room temperature. As described above, the value of $I_{run}$ at room temperature may be measured during certification of HDD 100.

At block 706, the controller modifies one or more parameters of a head unit of the drive in response to the determination of the change in the environment of the drive. As an example, the change of environment includes a change in atmospheric temperature, atmospheric pressure, or movement of data storage disk 106. In particular embodiments, the controller modifies a temperature of the read/write head of HDD 100 based on a change of temperature determined by a change in $I_{run}$. As an example, the temperature of the read/write head may be modified by applying a current to a resistive element positioned in proximity to the read/write head.

As such, as provided herein, is a method, including receiving data corresponding to a current of a spindle motor of a drive (e.g., HDD 100). In particular embodiments, the data associated with the motor may include temperature data and $I_{run}$ data. The $I_{run}$ data may be been stored by a SMART system of HDD 100. The method further includes determining whether a change in a temperature of the HDD has occurred based on a pre-determined relationship between the temperature and the data. In particular embodiments, a pre-determined relationship between the $I_{run}$ and atmospheric temperature may be stored on HDD 100. As an example, the pre-determined relationship may be determined experimentally using $I_{run}$ data from a number of HDDs 100 with a particular configuration (e.g., form factor, number of data storage disks 106, rotational speed of rotating member of spindle motor 110, etc.). In particular embodiments, the relationship between atmospheric temperature and $I_{run}$ variation may be modeled using a $2^{nd}$ order polynomial. In response to the change in environment of HDD 100, one or more parameters of a head unit of the HDD are modified. As an example, the change of parameters may change the temperature of the read/write head of HDD 100. The temperature of the read/write head may be performed by applying a current to a resistive element positioned in proximity to the read/write head.

Also provided herein is a computer-readable non-transitory storage medium embodying software that is configured when executed to modify one or more parameters of HDD 100 in response to the determination of the change in the environment of HDD 100. For example, the software is further configured to determine a change of temperature of the HDD based on a change in the data. The software may be further configured to modify a temperature of a head (e.g., read/write head) of HDD 100 by applying a current to a resistive element positioned in proximity to the head.

Also provided herein is an apparatus that includes a motor configured to rotate a rotating member at a rotational speed based on an applied current. The apparatus also includes a controller that is configured to modify one or more operating parameters in response to determining whether a change in an environment has occurred based on the applied current. As an example, the change in the environment may include a change in atmospheric temperature, atmospheric pressure, or movement of a data storage disk. Furthermore, the change in temperature may be measured relative to a calibration temperature. In particular embodiments, the apparatus further includes a read/write head that is configured to modify its shape based on the determination of whether a change in the environment has occurred. As an example, the controller may be configured to modify the shape of the read/write head through application of a current to a resistive element positioned in proximity to the read/write head.

In particular embodiments, the controller is further configured to determine a change of temperature based on a change in the applied current to the motor. As an example, the controller is configured to determine the change of temperature based on a value of the applied current and a pre-determined relationship between a temperature and the value of the applied current. The pre-determined relationship between the temperature and the value of the applied current may be based on a number of data storage disks, rotational speed of the motor, physical dimensions, or any combination thereof. In addition, the pre-determined relationship between a temperature and the value of the applied current determined based on the relationship between the temperature and the value of the applied current for a number of HDDs 100 with similar characteristics.

While the embodiments have been described and/or illustrated by means of particular examples, and while these embodiments and/or examples have been described in considerable detail, it is not the intention of the Applicant to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A method comprising:
   receiving data corresponding to a current of a spindle motor of a drive;
   determining whether a change in a temperature of the drive has occurred based on a pre-determined relationship between the temperature and the data; and
   modifying one or more parameters of a head unit of the drive in response to the determination of the change in the environment of the drive.

2. The method of claim 1, wherein the modification comprises modifying a temperature of a head of the drive.

3. The method of claim 2, wherein modifying the temperature of the head comprises apply a current to a resistive element positioned in proximity to the head.

4. The method of claim 1, wherein the change in temperature is relative to a calibration temperature of the drive.

5. The method of claim 1, wherein the pre-determined relationship is based on a number of data storage disks, rotational speed of the spindle motor, form factor of the drive, or any combination thereof.

6. The method of claim 1, wherein the pre-determined relationship determined based determining a relationship between the temperature and the current for a plurality of drives with similar characteristics.

7. A computer-readable non-transitory storage medium embodying software that is configured when executed to:
   receive data corresponding to a current of a spindle motor of a drive;
   determine whether a change in an environment of the drive has occurred based on the data; and
   modify one or more parameters of the drive in response to the determination of the change in the environment of the drive,
   wherein the software is further configured to determine a change of temperature of the drive based on a change in the data.

8. The medium of claim 7, wherein the change in temperature is relative to a calibration temperature of the drive.

9. The medium of claim 7, wherein the software is further configured to modify a temperature of a head of the drive.

10. The medium of claim 9, wherein the software is further configured to apply a current to a resistive element positioned in proximity to the head.

11. An apparatus comprising:
    a motor configured to rotate a rotating member at a rotational speed based on an applied current; and
    a controller configured to modify one or more operating parameters in response to determining whether a change in an environment has occurred based on the applied current,
    wherein the change in the environment comprises a change in atmospheric temperature, atmospheric pressure, or movement of a data storage disk, and wherein the change in environment further comprises a change in temperature relative to a calibration temperature.

12. The apparatus of claim 11, further comprising a read/write head that is configured to modify its shape based on the determination.

13. The apparatus of claim 12, wherein the controller is further configured to modify the shape of the read/write head through application of a current to a resistive element positioned in proximity to the read/write head.

14. The apparatus of claim 13, wherein the controller is further configured to determine the change of temperature based on a change in the applied current.

15. The apparatus of claim 14, wherein the controller is further configured to determine the change of temperature based on a value of the applied current and a pre-determined relationship between a temperature and the value of the applied current.

16. The apparatus of claim 15, wherein the pre-determined relationship is based on a number of data storage disks, rotational speed of the motor, physical dimensions, or any combination thereof.

17. The apparatus of claim 15, wherein the pre-determined relationship determined based on the relationship between the temperature and the value of the applied current for a plurality of hard-disk drives with similar characteristics.

* * * * *